US007082676B2

(12) United States Patent
Ramirez et al.

(10) Patent No.: US 7,082,676 B2
(45) Date of Patent: Aug. 1, 2006

(54) ELECTROSTATIC DISCHARGE (ESD) TOOL FOR ELECTRONIC DEVICE UNDER TEST (DUT) BOARDS

(75) Inventors: Adalberto M. Ramirez, Hayward, CA (US); Robert J. Sylvia, Santa Clara, CA (US)

(73) Assignee: Qualitau, Inc., Santa Clara, CA (US)

( * ) Notice: Subject to any disclaimer, the term of this patent is extended or adjusted under 35 U.S.C. 154(b) by 335 days.

(21) Appl. No.: 10/635,770

(22) Filed: Aug. 5, 2003

(65) Prior Publication Data

US 2005/0028356 A1 Feb. 10, 2005

(51) Int. Cl.
*B23P 19/00* (2006.01)

(52) U.S. Cl. ............................ 29/741; 29/729; 29/705; 324/754; 324/761; 361/212

(58) Field of Classification Search .................. 29/729, 29/739, 740, 741, 758, 837; 324/754–764, 324/158.1; 439/66–68; 361/748, 785; 174/261–265, 174/255
See application file for complete search history.

(56) References Cited

U.S. PATENT DOCUMENTS 4,012,693 A * 3/1977 Sullivan ..................... 324/556
4,439,809 A * 3/1984 Weight et al. .............. 361/220
4,812,754 A * 3/1989 Tracy et al. ................ 324/754
4,814,698 A * 3/1989 St. Onge et al. ............ 324/754
5,309,327 A * 5/1994 Slater ......................... 361/805
5,793,218 A * 8/1998 Oster et al. ................. 324/754
5,926,027 A * 7/1999 Bumb et al. ................ 324/755
6,151,202 A * 11/2000 Mueller et al. ............. 361/212
6,170,329 B1 * 1/2001 Steketee ...................... 73/431
6,305,076 B1 * 10/2001 Bright ......................... 29/837
6,611,152 B1 * 8/2003 Ortman et al. .............. 324/754
6,904,671 B1 * 6/2005 Farrens et al. ................ 29/829

OTHER PUBLICATIONS

Diep, Tom and Durvury, Charvaka, "*Electrostatic Discharge* (*ESD*)", Application Report SSYA010, Texas Instruments Inc., Jan. 2001, pp. 1-8.

* cited by examiner

*Primary Examiner*—Minh Trinh
(74) *Attorney, Agent, or Firm*—Beyer Weaver & Thomas LLP

(57) ABSTRACT

An anti-electrostatic discharge (ESD) tool for engaging electronic device under test (DUT) boards whereby ESD damage to the tested devices is prevented. The tool includes an aluminum support frame, guides on opposing edges of one side of the frame for slidably receiving a DUT board, and at least one electrical shorting connector extending from the frame and electrically connecting and shorting socket connectors and leads of electronic devices when the DUT board is inserted into the guides. The electrical shorting connector preferably comprises an array of fine wire brushes which have sufficient rigidity and flexibility for engaging solder points on the DUT board for the socket connectors.

18 Claims, 3 Drawing Sheets

ELECTROSTATIC DISCHARGE (ESD) TOOL FOR ELECTRONIC DEVICE UNDER TEST (DUT) BOARDS

BACKGROUND OF THE INVENTION

This invention relates generally to the testing of electronic devices, such as packaged integrated circuits (ICs) which are mounted on device under test (DUT) boards, and more particularly the invention relates to a tool for handling DUT boards undergoing electrical testing.

Integrated circuits are typically tested in computer controlled test equipment in order to identify any defective circuits. The integrated circuits are packaged such as in dual in-line packages (DIPs) which can be plugged into sockets on a printed circuit board (PCB) for testing. The PCB will typically have a plurality of sockets for packaged ICs. Metal traces on the PCB connect the sockets to an edge connector on the PCB which is plugged into the test equipment.

A serious problem in handling ICs arises from the buildup of static electrical charge in the test environment. The electrostatic charge generally builds up over materials and components due to friction, movement, electrical currents, and other factors. Once such charge is created, it will discharge through any available path to ground or other electrical potential. An uncontrolled and sudden discharge can inadvertently destroy or degrade sensitive electronic devices, such as ICs. In test equipment, such discharge may take place through the user, cables, equipment cabinet frames, and the like.

Thus, it is critical that the devices being tested are not damaged by ESD either before, during, or after testing. Any such damage may ruin the device or may invalidate any collected test data.

Normally, the DUT boards are loaded with test devices over a table away from the test system. Once the DUT boards are loaded with test devices, they are carried over to and are connected with the test system. After the test is completed, the DUT boards are moved from the test system and returned to the loading table. The devices are then removed from the DUT board and stored in anti-static tubes.

Even if all normal precautions are taken, such as having the test operator use a ground strap, anti-ESD mats around the table and the like, there are still potential situations where the test device remains unprotected. Electrical charge can build up while the test device is inserted into the board test socket, and charge can also build up while transporting the DUT board from the table to the system, especially if the test operator has to disconnect a ground strap to reach the test system. Additionally, charge can build up while the DUT board is inserted or plugged into the test system and again when the DUT board is removed from the test system.

The only method of fully protecting a device against any type of ESD damage is to have all pins of a test device physically shorted to each other. This will prevent any charge buildup or electrical current flow between pins. Having an individual test device ESD tool does help protect devices most of the time while in transit, but such tools are difficult to remove and install once the board is inserted into the test system. Generally the DUT boards are located in hard to reach areas, and they are often too close to each other to allow the test operator to reach in and install or remove individual anti-ESD tools.

The present invention is directed to providing an ESD tool for handling DUT boards which overcomes these limitations in the prior art.

SUMMARY OF THE INVENTION

In accordance with the invention, a tool for preventing electrostatic discharge when handling an electronic device under test (DUT) board includes a support frame, guides on one side of the frame for slidably receiving a DUT board, and at least one electrical shorting connector extending from the frame and electrically connecting and shorting electrical leads of a device under test. The support frame preferably comprises an electrically conductive material such as aluminum which is electrically connected to the electrical shorting connector.

In a preferred embodiment, the support frame includes a handle for inserting a DUT board into a test system, and the support frame includes a connector for receiving a plug in patch cord for use in grounding the support frame. Mechanical stops are provided for limiting the travel of a DUT board when inserted into the guides.

In a preferred embodiment, the electrical shorting connector comprises a fine wire brush which physically and electrically engages leads of socket connectors, and thereby shorts the leads of a device under test which is plugged into the socket. When the DUT board includes more than one row of devices under test, a plurality of electrical shorting connectors is provided whereby all leads of the devices under test are shorted.

The invention and objects and features thereof will be more fully understood from the following description and appended claims when taken with the drawings.

DETAILED DESCRIPTION OF ILLUSTRATIVE EMBODIMENTS

Figure 1:
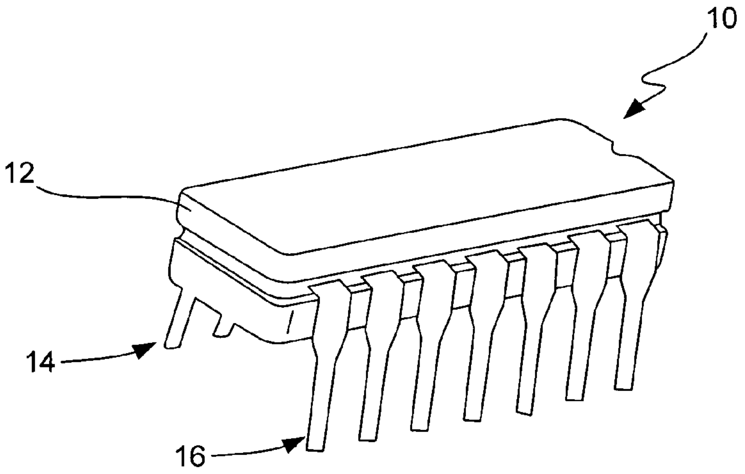
FIG. 1 is a perspective view of a conventional dual in-line package (DIP) integrated circuit.

FIG. 1 is a perspective view of an integrated circuit housed in a dual in-line package (DIP) shown generally at 10. The DIP has a body portion 12 comprising an epoxy material in which the integrated circuit is housed with two rows of leads 14, 16 extending therefrom.

Figure 2:
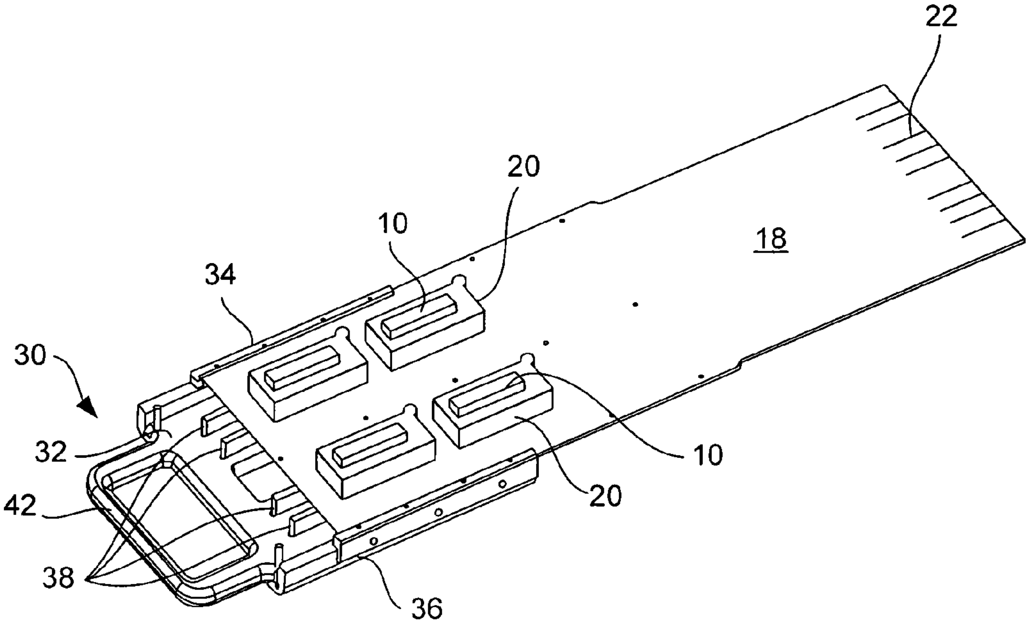
FIG. 2 is a perspective view of a device under test (DUT) board, on which a plurality of DIPs are mounted for testing with an anti-ESD handling tool in accordance with an embodiment of the invention mounted thereto.

FIG. 2 is a perspective view of a DUT board 18 having sockets 20 in which DIPs 10 are inserted for testing. The leads of sockets 20 are interconnected by conductive traces to contacts 22 at one end of board 18 for connecting the board in a test system.

As noted above, static electricity can build up during the loading and unloading of DIPs 10 in sockets 20 and in handling the boards 18 for insertion into or removal from an electronic test system. In accordance with the invention, an anti-electrostatic discharge (ESD) tool shown generally at 30 in accordance with an embodiment of the invention is provided for preventing electrostatic discharge (ESD) from damaging the DIPs 10. As shown in FIG. 2 and in more detail of FIG. 3, tool 30 includes a frame portion 32 of a conductive metal such as aluminum with two guides 34, 36 on opposing edges of one side of frame 32 for slidably receiving DUT board 18. Stops 37 are provided to limit the travel of DUT board 18 during insertion in the guides. Also mounted on the one side of tool 30 are a plurality of shorting connectors 38 which electrically engage contacts of the test sockets and the lead of DUTs 10.

Figure 4:
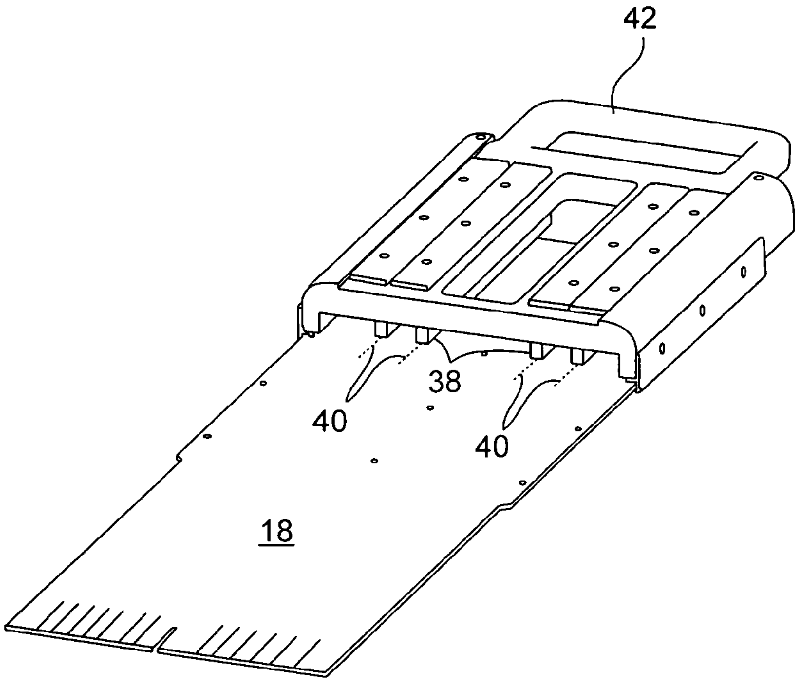
FIG. 4 is a perspective view of the DUT board and handling tool of FIG. 2 inverted to show the shorting of DIP leads.

FIG. 4 is a perspective view of DUT board 18 and tool 30 of FIG. 2 inverted to show the shorting of the DIP leads. Shorting contacts 38 physically engage the solder points of the socket leads on the bottom of board 18. The shorting contacts thus short the leads of DIPs 10 in the sockets to aluminum tool 30 which thereby prevents damage to the DIPS from electrostatic discharge.

A handle 42 is provided at one end of tool 30 to facilitate the insertion and removal of board 18 from the test system. Additionally, a patch cord receptacle 44 (FIG. 3) provides for attaching a grounding line to handle of tool 30. Normally, the DUT boards are loaded with test devices over a table away from the test system. Once the DUT boards are loaded, the boards are carried to and connected into the test system. After the test has been completed, the DUT boards are removed from the test system and returned to the loading table where the devices being tested are removed from the board and stored in antistatic tubes. During this time, the patch cord connected to the tool maintains the tool and the DUTs in a grounded state. Once the DUT board 18 is inserted into the test system, tool 30 is removed prior to testing so that the DIP leads are no longer shorted. The tool is then reapplied to the DUT board upon completion of the test for removal of the board.

Figure 3:
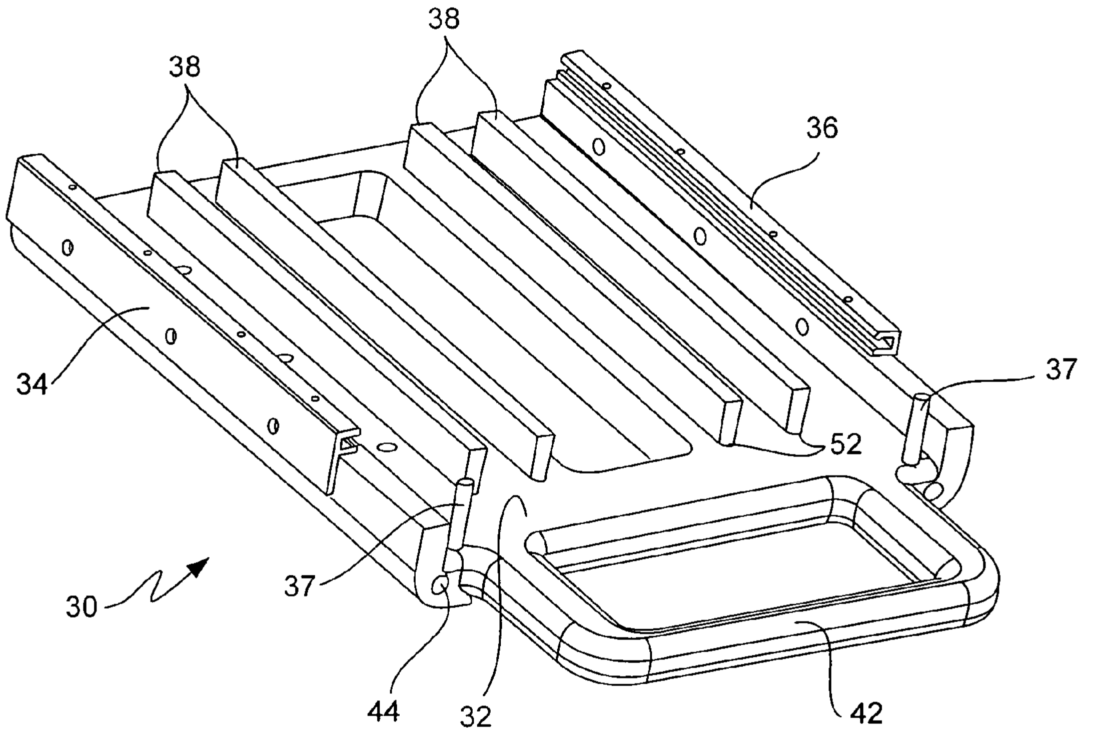
FIG. 3 is a perspective view of the DUT board handling tool shown in FIG. 2.
Figure 5:
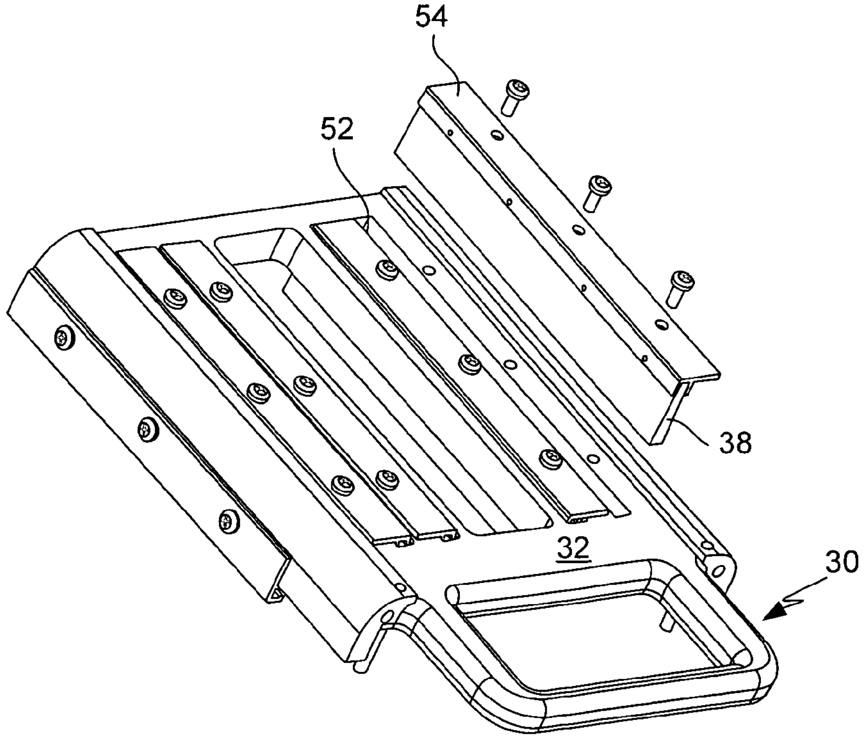
FIG. 5 is an exploded perspective view of an electrical shorting connector on the handling tool of FIGS. 2, 3 and 4 in accordance with an embodiment of the invention.

FIG. 5 is an exploded perspective view of an electrical shorting connector on the tool of FIGS. 2, 3, 4 in accordance with an embodiment of the invention. Fine wire brush 38 is configured to place through slots 52 in frame 32 of tool 30 with plates 54 fastened to frame 32 to maintain the fine wire brush in slots 52 and extending from the other side of frame 32, as shown in FIG. 3, for example. The wire brush provides sufficient rigidity and flexibility so that the solder points 40 on DUT board 18 are physically and electrically contacted when board 18 is inserted fully in guides 34, 36 of tool 30.

The anti-ESD tool in accordance with the invention has proved to be successful in preventing damaging electrostatic discharge, even when the patch cord is disconnected from the tool. The tool can be custom designed to fit various types and configurations of DUT boards.

Thus while the invention has been described with reference to specific embodiments, the description is illustrative of the invention and is not to be construed as limiting the invention. Various modifications and applications may occur to those skilled in the art without departing from the true scope and spirit of the invention as defined by the appended claims.

What is claimed is:

1. A tool for preventing electrostatic discharge damage when handling an electronic device under test (DUT) board, where a device plugs into a socket on one side of a board and socket connectors can be electrically accessed from the other side of the board, the tool comprising:

a) a support frame, b) guides on one side of the frame for slidably receiving a DUT board, and c) at least one electrical shorting connector extending from the frame and adapted for electrically contacting and shorting socket connectors and leads of an electronic device to be tested when a DUT board is inserted into the guides, the electrical shorting connector preventing electrostatic discharge to the electronic device to be tested.

2. The tool as defined by claim 1 wherein the support frame comprises an electrically conductive material which is electrically connected to the at least one electrical shorting connector.

3. The tool as defined by claim 2 wherein the electrically conductive material is aluminum.

4. The tool as defined by claim 3 wherein the support frame includes a handle for inserting a DUT board into a test system.

5. The tool as defined by claim 4 wherein the support frame includes a connector for receiving a plug-in patch cord for use in grounding the support frame.

6. The tool as defined by claim 5 wherein the support frame includes mechanical stops for limiting the travel of a DUT board when inserted into the guides.

7. The tool as defined by claim 6 wherein the DUT board includes a plurality of sockets which receive a plurality of electronic devices for testing, the at least one electrical shorting connector begins adapted to electrically connect and short socket connectors and leads of the plurality of electronic devices.

8. The tool as defined by claim 7 and further including a plurality of electrical shorting connectors.

9. The tool as defined by claim 8 wherein the electronic devices are in dual in-line packages (DIPs) with parallel sets of leads received by the sockets.

10. The tool as defined by claim 9 wherein a plurality of electrical shorting connectors are adapted to electrically short the parallel sets of leads.

11. The tool as defined by claim 10 wherein each electrical shorting connector comprises an array of fine wire brushes.

12. The tool as defined by claim 1 wherein each electrical shorting connector comprises an array of fine wire brushes.

13. The tool as defined by claim 12 the support frame comprises an electrically conductive material which is electrically connected to the at least one electrical shorting connector.

14. The tool as defined by claim 13 wherein the support frame includes a handle for inserting a DUT board into a test system.

15. The tool as defined by claim 14 wherein the support frame includes a connector for receiving a plug-in patch cord for use in grounding the support frame.

16. The tool as defined by claim 15 wherein the support frame includes mechanical stops for limiting the travel of a DUT board when inserted into the guides.

17. The tool as defined by claim 16 wherein the DUT board includes a plurality of sockets which receive a plurality of electronic devices for testing, the at least one electrical shorting connector being adapted to electrically connect and short socket connectors and leads of the plurality of electronic devices.

18. The tool as defined by claim 17 and further including a plurality of electrical shorting connectors.

* * * * *